Figure 1:
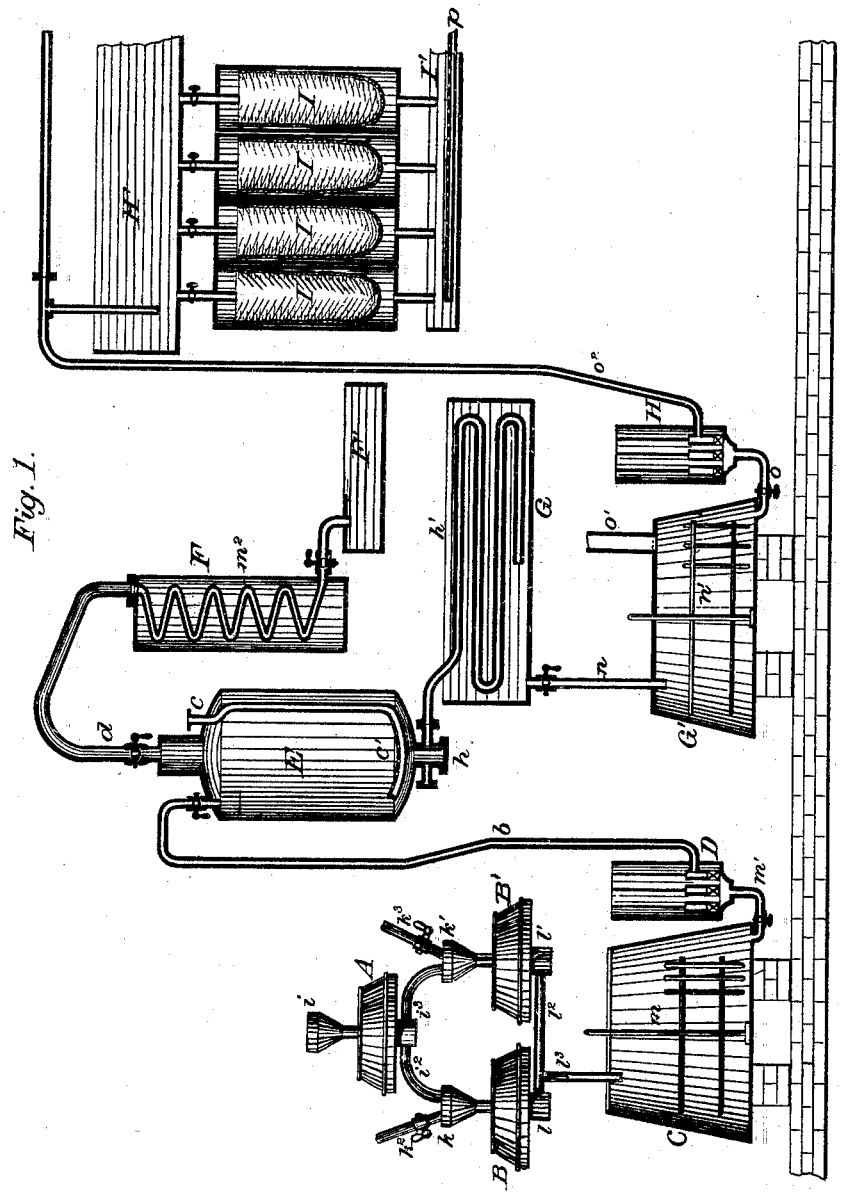

2 Sheets—Sheet 1.

A. MANBRÉ.
APPARATUS AND PROCESS FOR MANUFACTURING PURIFIED SACCHARINE SOLUTIONS.

No. 187,881. Patented Feb. 27, 1877.

Attest:
R. N. Dyer.

Inventor:
Alexandre Manbré.
by Geo. W. Dyer &co.
Atty's.

A. MANBRÉ.
APPARATUS AND PROCESS FOR MANUFACTURING PURIFIED SACCHARINE SOLUTIONS.

No. 187,881. Patented Feb. 27, 1877.

Attest:
Charles Thurman
R. T. Dyer

Inventor:
Alexandre Manbré
by Geo. W. Dyer & Co.
Attys.

UNITED STATES PATENT OFFICE.

ALEXANDRÉ MANBRÉ, OF PENGE, ENGLAND.

IMPROVEMENT IN APPARATUS AND PROCESSES FOR MANUFACTURING PURIFIED SACCHARINE SOLUTIONS.

Specification forming part of Letters Patent No. 187,881, dated February 27, 1877; application filed May 5, 1876.

*To all whom it may concern:*

Be it known that I, ALEXANDRÉ MANBRÉ, of Penge, in the county of Surrey, England, have invented a new and Improved Apparatus and Process for Manufacturing Purified Saccharine Solutions; and I do hereby declare that the following is a full and exact description of the same, reference being had to the accompanying drawings, and to the letters of reference marked thereon.

My improved process relates to extracting the fatty matter of cereals, seeds, nuts, roots, and other vegetable substances containing fatty, starchy, and saccharine matters, thereby freeing the starchy and saccharine matters from the fatty matter, and rendering them more suitable for the manufacture of pure and fine-flavored sugar, spirit, wine, beer, and other fermented beverages.

Spirit has hitherto been produced by subjecting cereals, seeds, nuts, roots, and other vegetable substances containing fatty, starchy, and saccharine matter, to the well-known processes of soaking, germinating, drying, squeezing, grinding, brewing, macerating, converting, fermenting, and distilling off the spirit produced without previously extracting or separating the fatty matter contained in such substances.

Spirit thus produced is contaminated with so large a quantity of the fatty matter (empyreumatic oil) as to render it unfit for immediate consumption, thus requiring to be purified by rectification, which greatly increases its cost of production.

Sugar known in the trade as glucose sugar, and obtained from cereals and other vegetable substances, is likewise produced without previously extracting or separating the fatty matter contained in such substances. Sugar thus produced is likewise contaminated with so great a quantity of fatty matter as to limit its use to a few branches of the trade. Wine, beer, vinegar, and other fermented beverages are likewise produced without previously extracting the fatty matter of the substances used in their manufacture, and for this reason the said beverages are produced only by the use of a few selected substances nearly free from fatty matter, such as grapes, sugar, and barley-malt.

Attempts have, however, been made to extract the oil from certain substances, such as maize and chestnuts; but the processes used for that purpose are so tedious and defective, and require so much labor and time and costly plant and machinery, and, consequently, such a large capital, as to render them, if not impracticable, commercially unprofitable.

This invention relates, however, more especially to certain improvements in the process and apparatus described in English patents granted to me, and has for its object to simplify the manufacture to such an extent as to dispense with a great portion of the plant and machinery heretofore used, and with the numerous manipulations of treating and preparing the raw material previously to its being operated upon, thereby materially reducing the cost of plant and machinery and of the manufacture.

By my improved process I simply disintegrate and grind in water cereals, seeds, nuts, roots, vegetable and other substances containing fatty, starchy, and saccharine matters, and subject the mixture thus obtained, acidulated with sulphuric acid or other suitable acid, to the action of heat in a part of the apparatus hereinafter described, and the whole of the fatty matter contained in the substances operated upon is vaporized and distilled off from the mixture by means of the still. I thereby obtain, in one operation, a fatty product ready for the market, while the starchy matter contained in the said mixture, and which has been freed from the fatty matter, has, by the same action of heat, been converted into a solution of saccharine matter with which glucose sugar, sirup, beer, spirit, or other fermented beverages of a superior quality can be produced.

The process I employ in practicing my said invention is as follows: First, I take maize, big rice, barley, rye, oats, millet, and other grain or seed containing fatty and starchy matter in its normal state—namely, as it is sold in the market—either sound or damaged by sea or otherwise, as the case may be, and subject it to a disintegrator to be reduced to a coarse meal; or I subject chestnuts or other congenerous and analogous nuts to a decorticating apparatus, to remove their skins. The skinned chestnuts are then gradually passed through disintegrating apparatus, to be reduced to a coarse pulpy matter. I treat the ground nut or Omendoun root, or Jerusalem artichoke, sweet and other potatoes, and manioca plant, and the like, by subjecting the same to the disintegrating apparatus, to be reduced to a pulpy matter. I remove the shell of cocoa-nuts, and the like, in the usual way, and then subject the kernel to the disintegrator, to be reduced to a pulp.

The meal or pulp thus obtained is then conveyed into a grinding-mill with water in such proportion as to obtain a density in the resulting mass of from 1.020 to 1.070 specific gravity, according to the relative amount of water supplied. The mixture, thus obtained, is conveyed into a wooden vessel called a receiver, in which it is kept in motion by means of stirrers, to prevent the settling of the starchy matter at the bottom of the vessel pending its subjection to the action of heat, as hereinafter described.

In treating maize, barley, big rice, wheat, rye, oats, millet, chestnuts, ground-nuts, sweet and other potatoes, Jerusalem artichokes, manioca root, sago, cocoa and other nuts, and other congenerous and analogous grains, seed, root, plant, nut, and other vegetable substances, containing fatty and starchy matters, by the process above described, I am able to extract the whole amount of fatty and starchy matter of each of the above-named grains, seed, nut, plant, root, or vegetable, and by subjecting the mixture thus obtained to the said process, and by means of the apparatus hereinafter described, I am able to distill off the fatty matter, and to convert the starchy matter into pure fermentable saccharine matter, free from gum, mucilage, nitrogenous matter, and empyreumatic oil, and other organic and inorganic matter, thereby rendering the saccharine thus obtained completely pure, and suitable to be used for making sugar, beer, spirit, vinegar, cider, perry, grape and fruit wines, and other fermentable drinks; also, for making sirups, liquors, chocolate, confectionery, pastry, preserves, and other similar purposes, and for sweetening tea, coffee, cocoa, and other dietary and dietetic purposes.

The apparatus I use to extract the empyreumatic oil and fatty matter from the substances above named, and to procure a purified saccharine solution from the same, is represented in the accompany drawings, in which—

Figure 2:
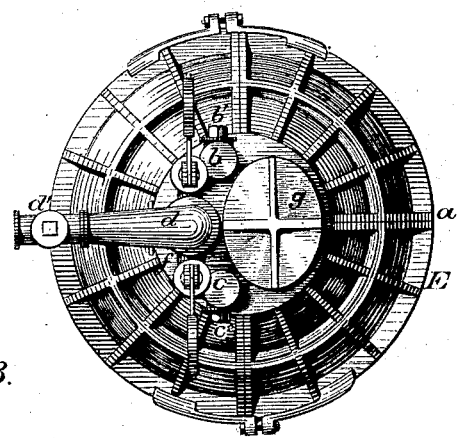
Figure 3:
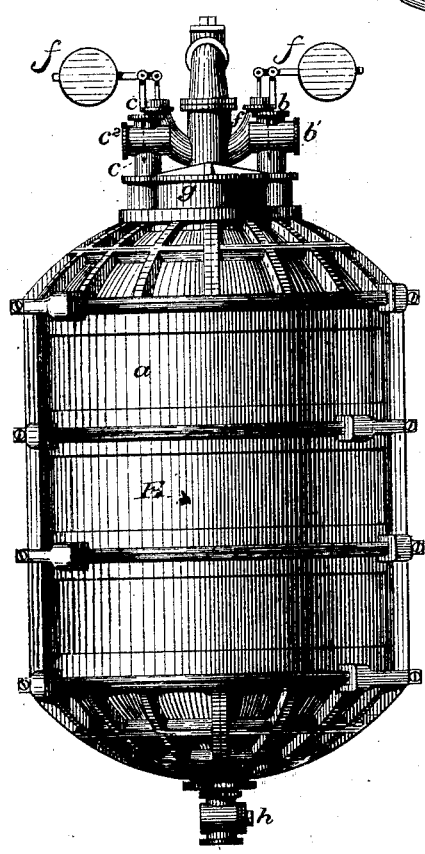
Figure 4:
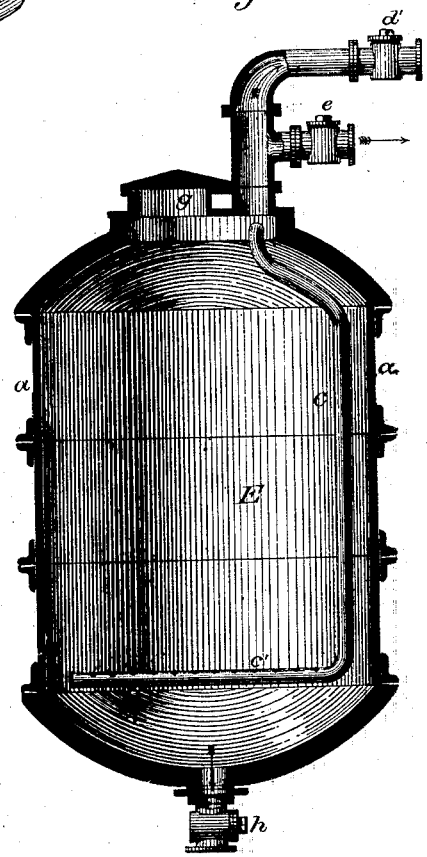

Figure 1 is a side elevation, mostly in section, of my entire apparatus. Fig. 2 is a top view of the converter detached; Fig. 3, a side elevation of the same; and Fig. 4, a central vertical section of the same.

Like letters denote corresponding parts in each figure.

A represents a grinding-mill, of any ordinary construction, and mounted in any convenient manner. This mill is provided with a hopper, $i$, which receives the unground material, and an exit, $i^1$, into which the ground material passes. The exit of this mill is connected by pipes $i^2 i^3$ with the hoppers $k k^1$ of two other grinding-mills, B B′, situated below the first. These hoppers $k k^1$ are also connected with two pipes, $k^2 k^3$, adapted to supply water to the mills. These pipes are connected to any water-supply, and are provided with suitable stop-cocks at some desirable point. The exits $l l^1$ of the mills B B′ are connected, by pipes $l^2 l^3$, with a vat, C, supported below their level. The vat is provided with a rotary stirrer, $m$, operated in any convenient manner. Out of the bottom of the vat C opens a pipe, $m^1$, provided with a suitable stop-cock, and connecting the vat with a pump, D, preferably a three-throw pump. A pipe, $b$, runs from the pump to the top of the elevated converter E, of peculiar construction. This converter has a body, $a$, of cast-iron or other suitable metal, preferably of the shape shown, or substantially so, and capable of resisting a pressure of one hundred and fifty pounds per square inch. The body is lined inside with a non-corrosive metal. The pipe $b$, connecting with the pump, through which the material is introduced into the converter, is provided with a cock, $b'$. A steam-pipe, $c$, enters through the top of the converter, and runs down one side nearly to the bottom, where its lower end $c^1$ is bent across the lower part of the converter, and is perforated. The pipe $c$ is fitted with a stop-cock at $c^2$. A large pipe, $d$, opens out of the top of the converter, and is provided with a stop-cock, $d'$. This pipe $d$ bends over and is connected to the upper end of a condensing-coil, $m^2$, inclosed in a water-vessel, F. The lower end of the coil passes out through the side of the water-vessel F, near its bottom, and terminates in a receiving vat or pan, F′. Out of the side of the pipe $d$, just above the converter, opens a steam-cock, $e$. The converter is also provided with safety-valves $f f'$ and a man-hole, $g$, in its top. To the lower end of the converter is connected a pipe, $h$, terminating in a cooling-coil, $h'$, in a vat, G, placed below the converter. A pipe, $n$, provided with a suitable stop-cock, runs from the cooling-vat G to another vat, G′, provided with a stirrer, $n'$. Out of the bottom of the vat G′ opens a pipe, $o$, running to a pump, H, preferably a three-throw pump.

Out of the top of this vat rises a pipe, $o^1$, connected with a gas-purifier and a receiving-vessel (not shown.) The pump H is connected by a pipe, $o^2$, with an elevated settling pan or vat, H′. Connected to this vat, by suitable pipes having stop-cocks, are bag filters I, and below the bag filters is placed a receiving-vat, I′. This vat may be provided with a perforated gas-pipe, $p$, in its bottom, which is shown in Fig. 1, for the introduction of carbonic-acid gas, in which case another series of bag-filters should be placed below the vat I', and a final receiving-vat below the filters.

In addition to the stop-cocks described and shown, others may be provided at various points where it is desired to stop the operation.

The manner in which the process is conducted in the above-described apparatus is as follows: I take a given quantity of any of the materials heretofore named—for instance, one thousand gallons of unground maize—and pour it into the hopper of the mill A, where it is ground; from thence the meal passes through the pipes $i^2$ $i^3$ into the mills B B'. At the same time a stream of water is let into each of the mills B B' through the pipes $k^2$ $k^3$, in such proportions that the mixture of meal and water will assume a density of from 1.020 to 1.070 specific gravity. This mixture passes through the mills B B', and issues in a stream from the pipe $l^3$ into the vat C, where it is kept in motion by the stirrer m. While the mixture is in the vat C I add to the same about two gallons of sulphuric acid, which is thoroughly incorporated by the stirrer. The mixture is then let into the pump D, which forces it through the pipe b into the top of the converter E, entering the said converter in a descending direction. At the same time steam is let into the pipe c, passes down the same, and issues from the perforations in the lower bent end $c^1$ of the pipe into the converter. The steam enters the converter, near the bottom of the same, in numerous small jets, taking an upward direction, and meets the descending mixture and divides it into particles, at the same time coagulating the gluten and albumen contained in it, converting the starchy matter into saccharine, which falls to the bottom of the vat, and vaporizing and taking up the empyreumatic oil and fatty matter. The steam, combined with the vapor of the empyreumatic oil and fatty matter, passes into the pipe d under pressure, and thence into the condensing-coil $m^2$, the distilled water and fatty matters running into the pan or vat F'. The empyreumatic oil and fatty matter in the vat F' may be readily separated from the water and sold to the trade.

The coagulation of the gluten and albumen, the conversion of the starchy matter into saccharine, the vaporizing of the fatty matters, and the distillation of the water and fatty matters, take place almost immediately in proportion as the mixture is introduced into the converter.

When the whole of the mixture has passed into the converter, I continue to blow in the steam, to raise the temperature in the mixture up to about 320° Fahrenheit, (ninety pounds pressure per square inch,) leaving the cock in the pipe d only partly open to get the required pressure, and to allow the empyreumatic oil and fatty matter, which have been vaporized during the rising of the temperature, to be expelled from the converter by the pressure of steam escaping through the pipe d, the fatty matters in the different materials used vaporizing at temperatures varying from 200° to 300° Fahrenheit.

I maintain the temperature 320° Fahrenheit until, by testing with iodine, all the starch is found to be converted, and further, until, by testing with absolute alcohol, it is found that there is no dextrine or gum in the saccharified liquid. The saccharine solution is then drawn off through the pipe h into the cooling-coil h', and thence into the vat G. The solution may be allowed to settle and cool in this vat, or drawn directly through the pipe n into the closed vat G'. The solution is kept in motion in the vat G' by the stirrer n'.

I then introduce into the saccharine a solution of carbonate of lime, (about forty-six pounds of lime dissolved in twenty gallons of water,) for the purpose of neutralizing the sulphuric acid, which solution of carbonate of lime is well mixed with the saccharified solution by the stirrer.

The carbonate of lime combines with the sulphuric acid, forming sulphate of lime, and producing at the same time carbonic-acid gas, which escapes through the pipe $o^1$ and is conveyed to a gas-purifier, and then into a receiver (not shown.)

The saccharine solution is then allowed to run through the pipe o into the pump H, by which it is elevated through the pipe $o^2$ into one or more settling-vats, $H^1$. After the saccharine has settled for some time, the same is drawn into the bag filters I, the sulphate of lime, coagulated gluten and albumen, and other foreign matters remaining in the bags, while the clean saccharine solution runs into the receiving-vat I'. At this point the saccharine solution is ready for immediate use.

If, however, it is desired to remove the minute portion of free lime remaining in solution, the carbonic-acid gas in the receiver is blown into the perforated pipe p in the solution in an upward direction, and, combining with the remaining portion of soluble lime, forms carbonate of lime. The saccharine solution is then passed through another series of bag filters and enters a final receiving-vat.

The pure solution can now be used for any of the purposes to which it is intended to be applied. For example, if intended to be used for making spirit, it is only required to cool the saccharine solution down to from 60° to 65° Fahrenheit, and set in fermentation, and distill off the spirit produced, as usual. If it is to be used for making beer, it is only necessary to add hops to the saccharine solution, and to subject the mixture of saccharine matter and hops to the process of boiling or maceration, or infusion, as desired, and to cool down to from 60° to 65° Fahrenheit, and set in fermentation, as usual.

The same process is applicable for producing vinegar, wines, cider, perry, and the like, by adding the saccharine solution to the substances used, and then set in fermentation. I can, however, convert the saccharine solution into a solid or other portable form, to be used in the manufacture of articles for all the purposes hereinbefore specified.

By the use of the apparatus and process above described, it will be seen that after the material is placed in the first grinding-mill no troublesome and expensive handling is required, and the operation may be kept up continuously, different parts of the process being performed at the same time in the several parts of the apparatus.

The saccharine solution in its portable form can be used as stated above; but it will be understood that where the grain is treated for any particular purpose—for instance, for the manufacture of beer—the proper stills and apparatuses, &c., are connected directly with the final receiving-vats, so as to make a continuous operation without any additional handling of the saccharine solution.

The differences between the process described in the before-mentioned English patents and that set forth in this application lie in the method of treating the grain before passing into the first receiving-vat. This improvement simplifies the process, and allows of treating the raw material as sold upon the market. It also cheapens the cost of manufacture, by doing away with a great portion of the plant or machinery, and the complicated manipulation of the material at this point.

The passing of the saccharine solution through a cooling-coil after leaving the converter, and the settling of the solution in vats before it is filtered, perfect the details of the process, and insure its successful operation.

The changes in the process are accomplished by corresponding changes in the apparatus.

These improvements cheapen and simplify the manufacture of the purified saccharine solution.

Having thus fully described my invention, and explained some of its advantages, what I claim as new, and desire to secure by Letters Patent, is—

1. To obviate the necessity of previously soaking the grain, and to better fit it for fermentation, the process of treating it previous to passing it into the first receiving-vat C, consisting in first grinding the raw material, as sold upon the market, in a mill or mills without water, and then grinding in another mill or mills with water, substantially as described.

2. The process described of treating the material to obtain a purified saccharine solution, consisting in first grinding in a mill or mills without water; then regrinding in a mill or mills with water; then conveying to a vat, and acidulating the mixture with sulphuric acid; then conveying the mixture into a converter, where the starchy and fatty matters are separated, and from which the fatty matters pass off and are distilled; then passing the saccharine solution through a cooling-coil; then conveying it into a vat, and introducing a solution of carbonate of lime, stirring the same into the mixture, and forming carbonic-acid gas and sulphate of lime, which is taken out of the vat; then conveying into a settling vat or vats; then passing through bag filters into a receiving-vat, substantially as described.

3. The process described of treating the material to obtain a purified saccharine solution, consisting in first grinding in a mill or mills without water; then regrinding in a mill or mills with water; then conveying into a vat and acidulating the mixture with sulphuric acid; then conveying the mixture into a converter, where the starchy and fatty matters are separated, and from which the fatty matters pass off and are distilled; then passing the saccharine solution through a cooling-coil; then conveying it into a vat, and introducing a solution of carbonate of lime, stirring the same into the mixture, and forming carbonic-acid gas and sulphate of lime, which is taken out of the vat; then conveying into a settling vat or vats; then passing through bag filters into a receiving vat; then blowing in carbonic-acid gas; then passing through bag filters into a final receiving-vat, substantially as described.

4. The combination of the mills A B B', vat C, provided with stirrer, pump D, converter E, distilling-coil $m^2$, vat F, cooling-coil $h'$, vat G, provided with stirrer, pump H, vat H', bag filters I, and receiving-vat I', all connected and arranged substantially as described and shown.

5. The combination of the mills A B B', vat C, provided with stirrer, pump D, converter E, distilling-coil $m^2$, vat F, cooling-coil $h'$, vat G, provided with stirrer, and pipe $o^1$, pump H, vat H', bag filters I, receiving-vat I', and perforated pipe $p$, all connected and arranged substantially as described and shown.

This specification signed and witnessed this 13th day of April, 1876.

ALEXANDRÉ MANBRÉ.

Witnesses:
I. A. V. LE LUBEZ,
T. W. FRIGOET.